US010389215B2

(12) United States Patent
Yabe et al.

(10) Patent No.: US 10,389,215 B2
(45) Date of Patent: Aug. 20, 2019

(54) MOTOR, BLOWER, AND COMPRESSOR (71) Applicant: Mitsubishi Electric Corporation, Tokyo (JP)

(72) Inventors: Koji Yabe, Tokyo (JP); Kazuhiko Baba, Tokyo (JP); Takahiro Tsutsumi, Tokyo (JP); Tomoaki Oikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 408 days.

(21) Appl. No.: 15/114,891

(22) PCT Filed: Mar. 31, 2014

(86) PCT No.: PCT/JP2014/059566
§ 371 (c)(1),
(2) Date: Jul. 28, 2016

(87) PCT Pub. No.: WO2015/151202
PCT Pub. Date: Oct. 8, 2015

(65) Prior Publication Data
US 2016/0344269 A1 Nov. 24, 2016

(51) Int. Cl.
H02K 15/00 (2006.01)
H02K 15/10 (2006.01)
(Continued)

(52) U.S. Cl.
CPC .......... H02K 15/0068 (2013.01); H02K 3/02 (2013.01); H02K 3/32 (2013.01); H02K 3/345 (2013.01);
(Continued)

(58) Field of Classification Search
CPC ............... H02K 15/0068; H02K 15/10; H02K 2203/06; H02K 2213/03; H02K 3/02;
(Continued)

(56) References Cited

U.S. PATENT DOCUMENTS 3,631,586 A * 1/1972 Bearpark ............. B21C 23/007
228/115
3,949,466 A * 4/1976 O'Brien .................. H01R 4/62
29/861

(Continued)

FOREIGN PATENT DOCUMENTS

CN 1223190 A 7/1999
CN 102447325 A 5/2012
(Continued)

OTHER PUBLICATIONS

Office Action dated Dec. 20, 2016 for the corresponding JP application No. 2016-511222 (and English translation).
(Continued)

Primary Examiner — Alex W Mok
(74) Attorney, Agent, or Firm — Posz Law Group, PLC (57) ABSTRACT A motor including a rotor, and a stator having a plurality of coils wound around slots, wherein at least any one of the coils includes a single aluminum wire, a single copper wire joined to the aluminum wire, a stranded wire (lead wire) joined to the copper wire, a cold-pressure-welded joint portion (joint portion) joined between the aluminum wire and the copper wire by cold pressure welding, and a non-pressure welded joint portion (joint portion) provided between the copper wire and the stranded wire (lead wire). A burr covered by an insulation member (insulation tube) is provided in the cold-pressure-welded joint portion (joint portion). A thickness of the insulation member (insulation tube) is larger than a height of the burr.

17 Claims, 4 Drawing Sheets (51) Int. Cl.
*H02K 3/50* (2006.01)
*H02K 5/22* (2006.01)
*H02K 3/02* (2006.01)
*H02K 3/32* (2006.01)
*H02K 3/34* (2006.01)

(52) U.S. Cl.
CPC .............. *H02K 3/50* (2013.01); *H02K 5/225* (2013.01); *H02K 15/10* (2013.01); *H02K 2203/06* (2013.01); *H02K 2213/03* (2013.01)

(58) Field of Classification Search
CPC  H02K 3/32; H02K 3/345; H02K 3/50; H02K 5/225; B23K 20/22
USPC ......................................................... 310/71
See application file for complete search history.

(56) References Cited

U.S. PATENT DOCUMENTS

| | | | | |
|---|---|---|---|---|
| 4,098,449 | A | * | 7/1978 | Noesen .............. B23K 20/2333 228/115 |
| 4,315,175 | A | | 2/1982 | Hamilton et al. |
| 4,331,280 | A | * | 5/1982 | Terabayashi ........... B23K 20/12 228/114.5 |
| 4,368,452 | A | * | 1/1983 | Kerr, Jr. ................. H01R 13/70 337/414 |
| 5,967,402 | A | * | 10/1999 | Kuwabara .............. B23K 28/00 228/194 |
| 6,692,841 | B2 | * | 2/2004 | Shindo ................... B23K 20/22 200/275 |
| 7,947,904 | B2 | | 5/2011 | Watanabe |
| 9,056,189 | B2 | * | 6/2015 | Murayama ............ A61M 25/09 |
| 2002/0061417 | A1 | | 5/2002 | Shindo et al. |
| 2003/0031889 | A1 | | 2/2003 | Shindo et al. |
| 2004/0030266 | A1 | * | 2/2004 | Murayama ............ A61M 25/09 600/585 |
| 2012/0080973 | A1 | | 4/2012 | Furukawa et al. |

FOREIGN PATENT DOCUMENTS

| | | |
|---|---|---|
| JP | 51-118077 U1 | 9/1976 |
| JP | 54-031513 A | 3/1979 |
| JP | 59-018832 B2 | 5/1984 |
| JP | 04-288983 A | 10/1992 |
| JP | 06-169540 A | 6/1994 |
| JP | 2000-152571 A | 5/2000 |
| JP | 2006-014385 A | 1/2006 |
| JP | 2009-009736 A | 1/2009 |
| JP | 2013-184179 A | 9/2013 |
| JP | 2014-072962 A | 4/2014 |
| WO | 2006/106971 A1 | 10/2006 |

OTHER PUBLICATIONS

International Search Report of the International Searching Authority dated Jun. 17, 2014 for the corresponding International application No. PCT/JP2014/059566 (and English translation).

Office Action dated Jan. 24, 2018 issued in corresponding CN patent application No. 201480076557.1 (and English machine translation thereof).

Office action dated Sep. 5, 2018 issued in corresponding CN patent application No. 201480076557.1 (and English machine translation thereof).

Office Action dated Jan. 31, 2019 issued in corresponding IN patent application No. 201647034871 (and English translation).

* cited by examiner

MOTOR, BLOWER, AND COMPRESSOR

CROSS REFERENCE TO RELATED APPLICATION

This application is a U.S. national stage application of International Patent Application No. PCT/JP2014/059566 filed on Mar. 31, 2014, the disclosure of which is incorporated herein by reference.

TECHNICAL FIELD

The present invention relates to a motor, a blower, and a compressor.

BACKGROUND

Hitherto, a technique of using an aluminum wire in a part of a coil of a motor to decrease the weight of the motor has been examined. When the aluminum wire is used in a part of the coil of the motor, a copper wire needs to be joined to the aluminum wire and thus there is a concern about electric corrosion. In order to prevent the electric corrosion, as a method of joining the copper wire to the aluminum wire, there is proposed a method of bringing end faces of both conductors into contact with each other and joining both conductors at a normal temperature (a cold pressure welding method (hereinafter, referred to as cold pressure welding)). The cold pressure welding is a highly reliable method of connecting wires using metal bonding at both new metal faces (non-oxidized metal faces) that are exposed when the wires are pressed against each other.

For example, Patent Literature 1 discloses a technique in which "a first conductor 10 and a second conductor 20 are connected to each other via a relay conductor 30"; "the first conductor 10 and the relay conductor 30, which are formed of different kinds of metal, are metal-bonded to each other by pressure welding"; and "the second conductor 20 and the relay conductor 30 are connected to each other by deforming a swaging piece 35, therefore, even when the second conductor 20 includes a stranded wire that is easily buckled, the second conductor 20 and the relay conductor 30 can be reliably connected to each other".

PATENT LITERATURE

Patent Literature 1: PCT Publication WO 2006/106971

However, according to the above-described related arts, when a burr is formed in a cold-pressure-welded joint portion, even if an insulation member is disposed, the protrusion of the burr breaks when the burr spreads. Further, the strength of a chuck portion formed by cold pressure welding is low. For that reason, a problem arises in that the insulation member is damaged during manufacture or operation.

SUMMARY

The present invention is made in view of the above-described situations and an objective of the present invention is to obtain a motor which is able to keep high reliability even when a light aluminum wire is used in a wound wire of a coil.

In order to solve the problem and achieve the objective mentioned above, the present invention relates to a motor that includes a rotor; and a stator having a plurality of coils wound around slots in the stator. At least any one of the coils includes a single aluminum wire; a single copper wire joined to the aluminum wire; a stranded wire joined to the copper wire; a cold-pressure-welded joint portion joining between the aluminum wire and the copper wire by cold pressure welding; and a non-pressure welded joint portion provided between the copper wire and the stranded wire. A burr covered by an insulation member is provided in the cold-pressure-welded joint portion. A thickness of the insulation member is larger than a height of the burr.

The motor according to the present invention has an effect that high reliability can be kept even when a light aluminum wire is used in a winding wire of a coil.

DETAILED DESCRIPTION

Hereinafter, an embodiment of a motor according to the present invention will be described in detail with reference to the drawings. Further, the present invention is not limited to the embodiment.

Embodiment

Figure 1:
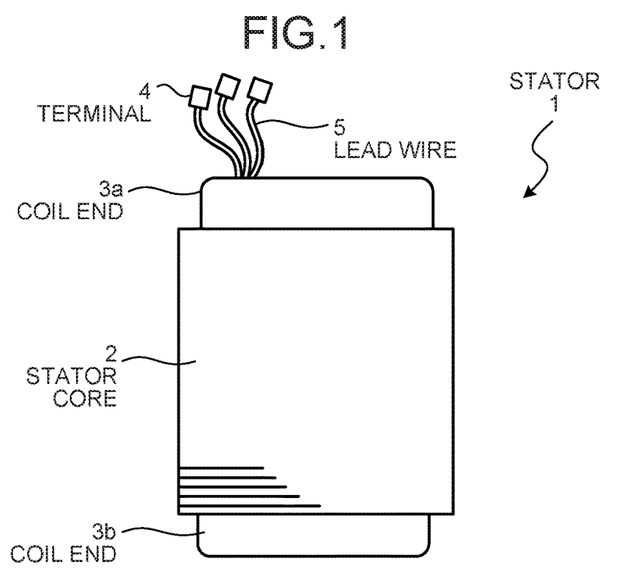
FIG. 1 is a diagram illustrating a side face of a stator of a motor according to an embodiment.

FIG. 1 is a diagram illustrating a side face of an embodiment of a stator of a motor according to the present invention. A stator 1 of the motor includes a stator core 2 and a plurality of coils inserted into slots (not illustrated) of the stator core 2. An electromagnetic steel sheet is laminated on the stator core 2.

Here, a single aluminum wire, which is insulated by a coating, is used in at least one (one phase or one kind of wiring) of a plurality of coils. Thus, a coil of at least any one of U, V, and W phases is an aluminum wire in a motor having three-phase coils; a primary coil or a secondary coil is an aluminum wire in a motor having a single-phase coil; and at least one wire is an aluminum wire in a motor having a plurality of coils formed in one slot in such a manner that two or more coils are connected in parallel.

In FIG. 1, because the coil is wound around the slots, coil ends 3a and 3b are formed in the ends of the stator core 2. A lead wire 5 having a terminal 4 formed at a leading end thereof is drawn out from the coil end 3a.

Figure 2:
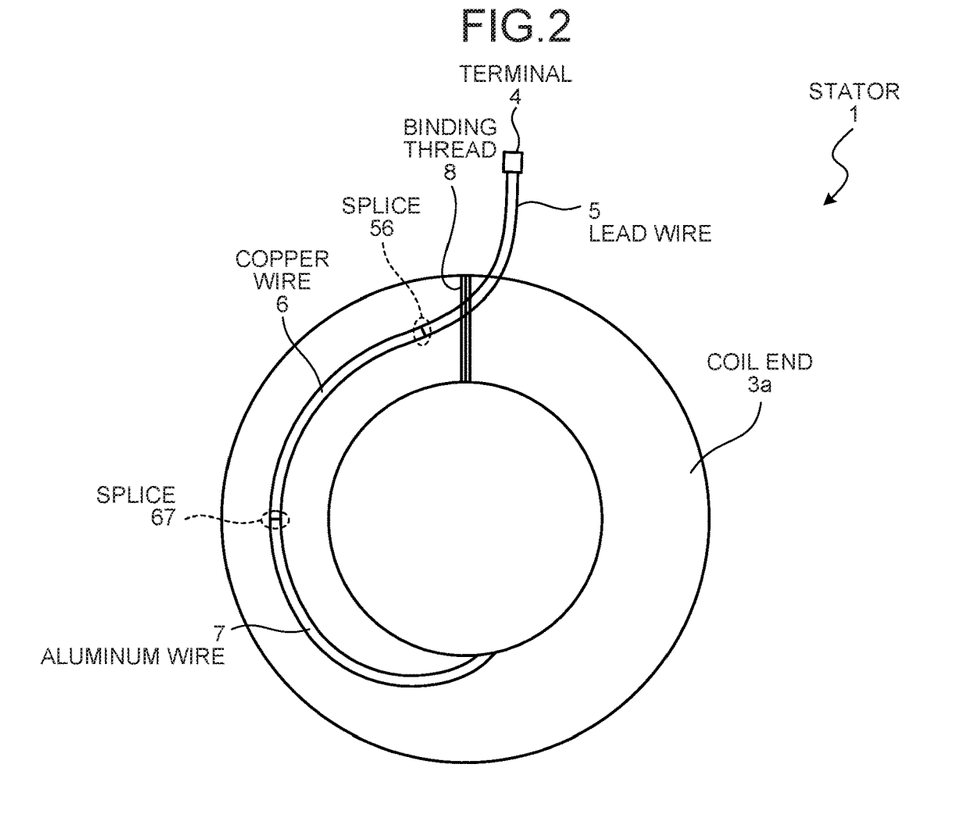
FIG. 2 is a diagram illustrating a top face of the stator of the motor according to the embodiment.

FIG. 2 is a diagram illustrating a top face (near the coil end 3a) of the embodiment of the stator of the motor according to the present invention. Further, in the top view in FIG. 2, an electromagnetic steel sheet is removed from the stator 1 to aid the description provided by the drawing.

The lead wire 5 having the terminal 4 formed at the leading end thereof is joined to a copper wire 6 via a joint portion 56. The copper wire 6 is joined to an aluminum wire 7 via a joint portion 67. The terminal 4 is connected to an external terminal of a power supply or the like. The lead wire 5 is a stranded wire. The copper wire 6 is a single copper wire. The lead wire 5 and the copper wire 6 are joined to each other by soldering or brazing.

Note that, in the present specification, the aluminum wire indicates a metal wire that mainly includes aluminum or an aluminum alloy and the copper wire indicates a metal wire that mainly includes copper or a copper alloy.

The aluminum wire 7, which is wound around the slot of the stator 1, is a single aluminum wire of which a winding start portion and a winding end portion are joined to the copper wire 6. Because an oxide coating is easily formed on a surface of the aluminum wire 7 and the effect of creep or stress relaxation due to heat is significant, the aluminum wire cannot be joined to the copper wire by heating. Here, if cold pressure welding is the joining method used, the aluminum wire 7 and the copper wire 6 can be joined to each other highly reliably by metal bonding at new metal faces (non-oxidized metal faces) when the wires are pressed against each other (at a normal temperature) without heating the wires at the joint targets. In contrast, when a stranded lead wire is joined to a joint target by a method such as cold pressure welding, the contact load easily decreases as time lapses, and thus contact area decreases. Therefore electrical resistance at the contact easily increases. For this reason, the joint targets cannot be joined with high reliability.

In FIG. 2, the aluminum wire 7, which is a single wire, and the copper wire 6, which is a single wire, are joined to each other by cold pressure welding; and the copper wire 6, which is a single wire, is joined to the lead wire 5, which is a stranded wire, by a method other than cold pressure welding (soldering or brazing). The reason why the copper wire 6 and the lead wire 5 are joined to each other by a method other than cold pressure welding is because the lead wire 5 has a stranded wire structure in which a thin copper wire is stranded. With such a structure, if subjected to cold pressure welding, stress applied to the wire during cold pressure welding is distributed and thus the joining is difficult.

The lead wire 5, which is joined to the copper wire 6, is drawn out toward the upper portion of the coil end 3a of the motor through the upper or side faces of the coil ends 3a and 3b. In FIG. 2, a base part of the drawn portion of the lead wire 5 is fixed by a binding yarn 8 (a drawn wire binding yarn) that arranges the lead wires. In general, a plurality of lead wires 5 are provided, but only one lead wire is illustrated in FIG. 2 in order to simplify the drawing.

Figure 3:
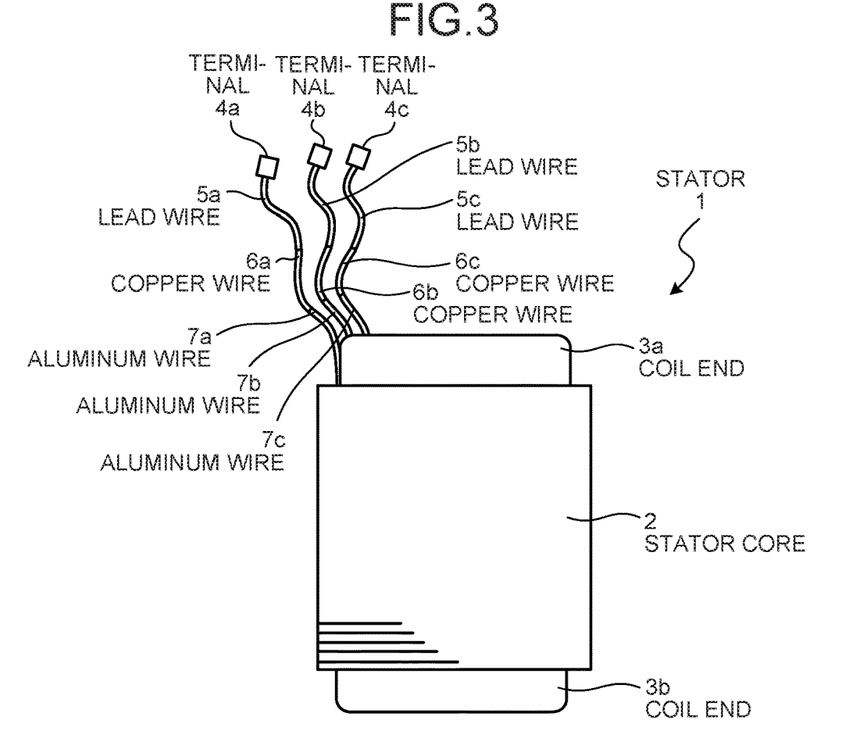
FIG. 3 is a diagram illustrating a side face of the stator in a state where a binding yarn of the stator of the motor according to the embodiment is removed.

FIG. 3 is a diagram illustrating a side face of the embodiment of the stator of the motor in a state where the binding yarn 8 is removed. In general, the number of lead wires is as many as necessary to apply power or to control the motor. Here, lead wires 5a to 5c respectively having terminals 4a to 4c formed at the leading ends thereof are respectively joined to copper wires 6a to 6c; and the copper wires 6a to 6c are respectively joined to aluminum wires 7a to 7c. Further, in FIG. 3, a structure is illustrated in which aluminum wire is used in all drawn wires, but the present invention is not limited thereto. It is preferable if the structure is such that aluminum wire is used for at least one drawn wire.

Figure 4:
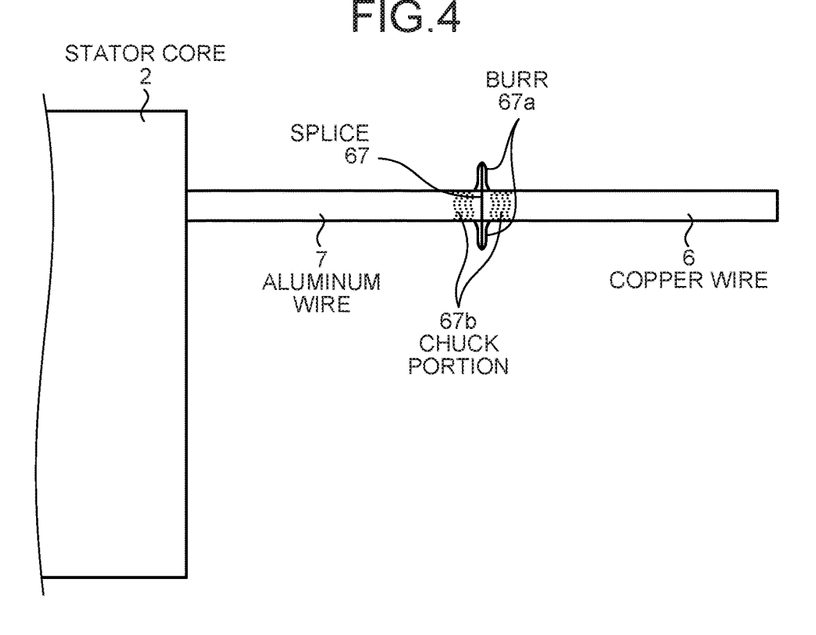
FIG. 4 is a diagram illustrating a method of manufacturing the motor according to the embodiment and is a diagram illustrating a state immediately after an aluminum wire and a copper wire are subjected to cold pressure welding.

FIG. 4 is a diagram illustrating an embodiment of a method of manufacturing the motor according to the present invention and is a diagram illustrating a state immediately after the aluminum wire 7 and the copper wire 6 are subjected to cold pressure welding. In FIG. 4, the stator core 2, the aluminum wire 7, and the copper wire 6 are illustrated, but the lead wire 5 is omitted. A burr, which is formed by cold pressure welding, is present at the joint portion 67 between the copper wire 6 and the aluminum wire 7.

As illustrated in FIG. 4, in cold pressure welding, the ends of two wires subjected to cold pressure welding are mechanically fixed by a chuck and the ends are joined while being pressed against each other. For this reason, the burr 67a is formed at the periphery of the joint portion 67. Because the wires to be joined to each other are pressed against each other while being fixed by a chuck, a chuck mark (a chuck portion 67b) remains in the vicinity of the joint portion of the target joint wires (here, the aluminum wire 7 and the copper wire 6). Because the formed burr 67a is not needed, the burr is removed.

Figure 5:
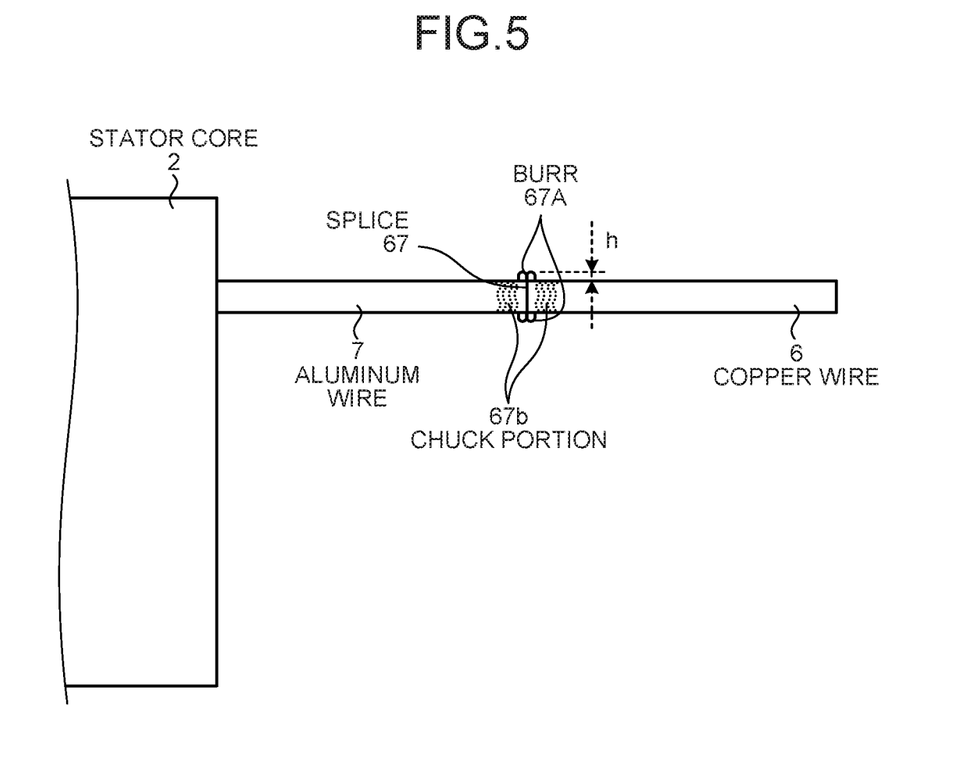
FIG. 5 is a diagram illustrating a method of manufacturing the motor according to the embodiment and is a diagram illustrating a state where a burr is cut off after the aluminum wire and the copper wire are subjected to cold pressure welding.

FIG. 5 is a diagram illustrating a state where the burr 67a is removed after the aluminum wire 7 and the copper wire 6 are subjected to cold pressure welding. As illustrated in FIG. 5, the burr 67A remains with a height h even after the cutting.

Figure 6:
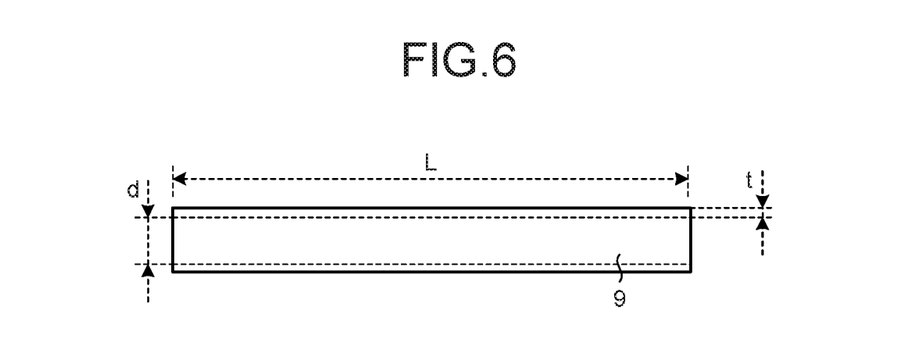
FIG. 6 is a diagram illustrating an insulation tube as an example of an insulation member attached to a coil of the motor according to the embodiment.

The joint portion between the aluminum wire 7 and the copper wire 6 is covered by, for example, an insulation tube 9 illustrated in FIG. 6. FIG. 6 is a diagram illustrating the insulation tube 9 having a length L as an example of an insulation member. As illustrated in FIG. 5, since the burr 67A remains at the joint portion that is subjected to cold pressure welding even after the burr is removed, a hole is made in the insulation tube 9 by the burr 67A when a thickness t of the insulation tube 9 is less than the height h of the burr 67A (i.e., when the insulation tube 9 is thin) and thus there is a concern about the insulation being poor. For that reason, when the thickness t of the insulation tube 9 is set to be larger than the height h of the burr 67A (h<t), it is possible to prevent the burr 67A, which remains after being removed, from penetrating the insulation tube 9 and thus to keep the insulation reliability of the insulation tube 9.

As illustrated in FIG. 6, when the insulation tube 9 has an inner diameter d, it is preferable (diameter of the insulated wire)+2h<d is satisfied in order to easily attach the insulation tube 9 to the wire. In the description above, rubber can be exemplified as a material of the insulation tube 9, but the present invention is not limited thereto. Examples of the material of the insulation tube 9 include insulation paper, resin, and tape. Even when the material of the insulation tube 9 is made of insulation paper, resin, or tape, it is preferable if the burr 67A does not penetrate through the insulation tube 9 when the thickness t of the insulation tube 9 is set to be larger than the height h of the burr. Further, when the material of the insulation tube 9 is thin like insulation paper, a structure in which a plurality of sheets of insulation paper are overlapped with one another can be employed. In such a structure, it is preferable that the thickness of the overlapped insulation paper be larger than the height of the burr. When the insulation tube 9 is formed of a resin material, the joint portion can be protected from external stress. Further, when the insulation tube 9 is formed of an insulation tube (a heat shrinkable tube) which is shrunk to fit by heating it, an inner diameter of the insulation tube before being shrunk by the heating is set to be an inner diameter d.

As illustrated in FIG. 5, the chuck mark (the chuck portion 67b) remains in the aluminum wire 7 and the copper wire 6 in the vicinity of the cold-pressure-welded joint portion. Because the mechanical strength of the chuck portion 67b decreases due to force applied thereto during the fixing operation, the strength of the chuck portion 67b decreases during cold pressure welding. After cold pressure welding, it is preferable to suppress the force applied to the chuck portion 67b as much as possible. Here, in the present embodiment, when a resin sleeve is used as the material of the insulation tube 9 to cover the chuck portion 67b by cold pressure welding, external stress may be received by the sleeve to suppress the force applied to the chuck portion 67b. As the resin material of the resin sleeve, fluorinated ethylene propylene (FEP), polyethylene terephthalate (PET), polyethylene naphthalate (PEN), polyphenylene sulfide (PPS), and the like can be exemplified. Further, when mold resin is used as the material of the insulation tube 9 to cover even the chuck portion 67b, stress applied to the chuck portion 67b can be decreased. When the cold-pressure-welded joint portion and the chuck portion are covered by mold resin, it is possible to prevent the wire from being broken due to the stress applied to the chuck portion. In this way, when the chuck portion is covered by the insulation tube formed of the resin material, the chuck portion with a reduced mechanical strength is protected from external stress. Note that the mechanical strength indicates strength with respect to tensile stress or bending stress.

Alternatively, the entire stator 1 may be covered by mold resin to obtain a mold stator. The mold stator can be obtained by injecting thermosetting resin (mold resin) such as bulk molding compound (BMC) into a mold that accommodates the stator 1 therein. When the stator 1 is formed as the mold stator, stress applied to the chuck portion can be reduced while the stator 1 and the cold-pressure-welded joint portion are insulated from each other. Further, when the stator 1 is formed as the mold stator, the entire stator 1 may be covered by mold resin after the stator is covered by the insulation tube. In this way, when the joint portion subjected to cold pressure welding and the stator are covered by mold resin, the joint portion does not move and stress is not easily applied to the joint portion. For this reason, the motor can be operated while the reliability of the joint portion is maintained.

When the stator 1 is formed as the mold stator, there is a possibility that the joint wire (wiring obtained by joining the lead wire 5, the copper wire 6, and the aluminum wire 7) may be moved by pressure generated when the mold stator is molded. Therefore, when the cold-pressure-welded joint portion is insulated by the insulation tube 9 as described above, it is possible to prevent a short-circuit caused by a contact with other wirings having different voltages or the electromagnetic steel sheet of the stator core 2.

Figure 7:
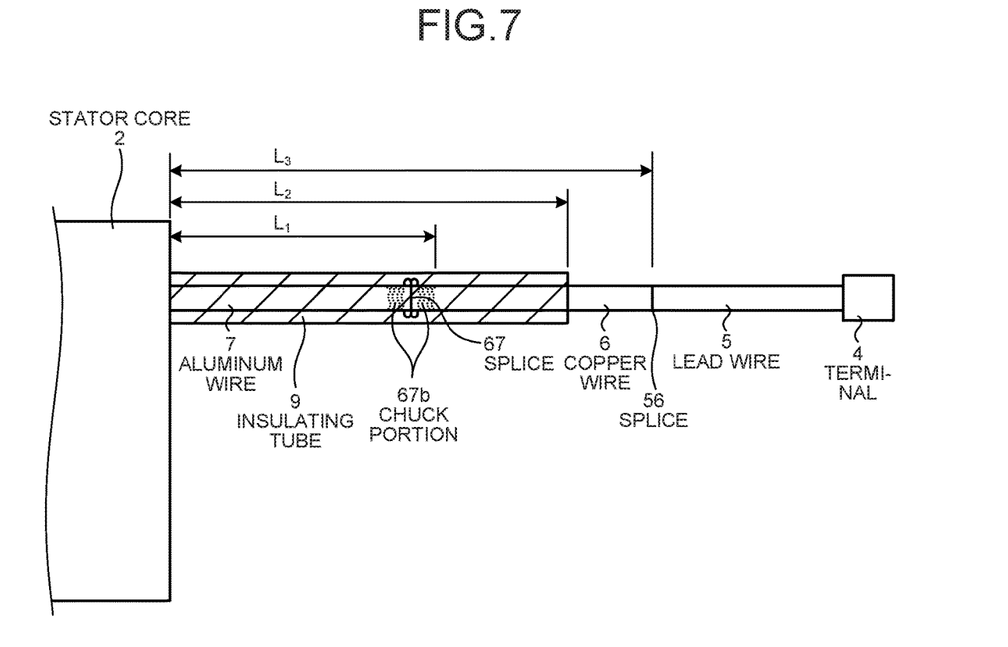
FIG. 7 is a diagram illustrating a state where a chuck portion and a cold-pressure-welded joint portion of the coil of the motor according to the embodiment are covered by a cylindrical (tubular) insulation tube.

FIG. 7 is a diagram illustrating a state where the cold-pressure-welded joint portion 67 and the chuck portion 67b are covered by the cylindrical (tubular) insulation tube 9. The cold-pressure-welded wire corresponds to the aluminum wire 7 and the copper wire 6.

In FIG. 7, a distance from an end face of the stator core 2 to the chuck portion 67b of the copper wire 6 is $L_1$, a length of the insulation tube 9 is $L_2$, and a distance from the end face of the stator core 2 to the joint portion 56 between the copper wire 6 and the lead wire 5 is $L_3$. As illustrated in FIG. 7, when a relation $L_1 < L_2$ is established, it is possible to prevent the chuck portion or the cold-pressure-welded joint portion, which is the joint portion 67 between the aluminum wire 7 and the copper wire 6, from being exposed even when the insulation tube 9 is slightly deviated toward the stator core 2.

In the present embodiment, because the aluminum wire 7 and the copper wire 6 are subjected to cold pressure welding, when the joint wire is lengthened, there is a concern that a short-circuit is caused by contacting with a wire of other phases having different voltages (for example, a V-phase or W-phase when the joint wire is a U-phase of a three-phase motor, or a secondary coil when the joint wire is a primary coil of a single-phase motor). As illustrated in FIG. 7, when the joint wire is covered by the insulation tube 9 from the end face of the stator core 2, it is possible to prevent contact with wirings of the other phases. As a result, because the wires are easily joined to each other, ease of operation is improved and productivity is improved.

Figure 8:
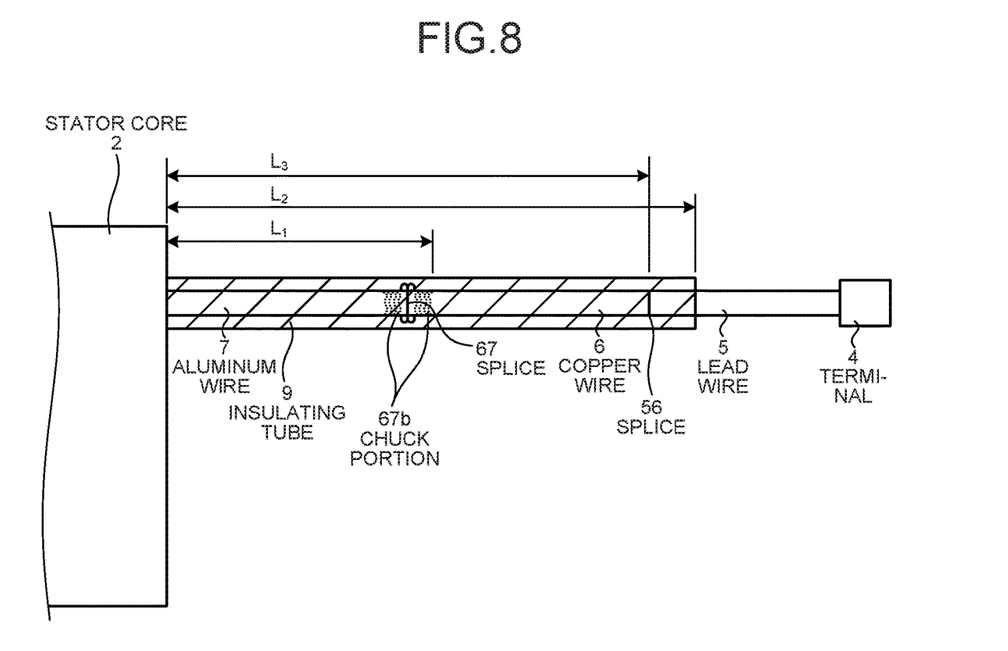
FIG. 8 is a diagram illustrating a state where a cold-pressure-welded chuck portion and all joint portions of the coil of the motor according to the embodiment are covered by an insulation tube.

FIG. 8 is a diagram illustrating a state where all joint portions and the cold-pressure-welded chuck portion are covered by the insulation tube 9. As illustrated in FIG. 8, when the relation $L_3 < L_2$ is established, it is possible to insulate both the joint portion 67 between the aluminum wire 7 and the copper wire 6 and the joint portion 56 between the copper wire 6 and the lead wire 5 with one insulation tube 9 and to protect the joint portion 56 between the copper wire 6 and the lead wire 5 in addition to the effect obtained by the configuration illustrated in FIG. 7. If the copper wire 6 is still damaged even when the burr of the joint portion 67 between the aluminum wire 7 and the copper wire 6 is removed, the damaged portion of the copper wire 6 can be protected and reinforced regardless of the damaged position of the copper wire 6. Further, it is preferable that the maximum size of the inner diameter d be equal to or smaller than 1.2 times the maximum edge side of the terminal 4. As illustrated in FIG. 8, when relation $L_1 < L_3 < L_2$ holds, the insulation tube 9 needs to pass through the terminal 4 after the wires are joined to each other at the joint portion 56, but if the inner diameter is larger than necessary, there is a concern that the insulation tube 9 may come off during operation. When the maximum size of the inner diameter d is less than 1.2 times the maximum edge side of the terminal 4, it is possible to prevent the insulation tube 9 from coming off during operation. As illustrated in FIG. 7, when $L_1 < L_2 < L_3$ holds, it is preferable that the inner diameter d of the insulation tube 9 be set to a size in which the terminal 4 does not pass through the insulation tube. As illustrated in FIG. 7, when $L_1 < L_2 < L_3$ holds, because the wires can be joined to each other at the joint portion 56 after the insulation tube 9 is attached thereto, the terminal 4 does not need to pass through the insulation tube 9. Further, because the inner diameter d of the insulation tube 9 is set to a size in which the terminal 4 does not pass therethrough, it is possible to prevent the insulation tube 9 from coming off during operation.

With regard to the cold-pressure-welded coil, the chuck portion in the vicinity of the cold-pressure-welded joint portion is easy to be broken. If unexpected stress is applied to the chuck portion when the motor is manufactured, there is a concern that the chuck portion may be damaged. Here, it is preferable to use a transparent tube as the insulation tube 9. When a transparent tube is used as the insulation tube 9, it is possible to visually monitor the state of the chuck portion in the vicinity of the cold-pressure-welded joint portion. Thus, it is possible to pay attention to the fragile chuck portion and to visually check it when damaged.

Regarding the joint wire subjected to cold pressure welding at two or more positions, if the insulation tube 9 is transparent and at least one of two cold-pressure-welded joint portions is marked, each phase can be easily determined, which improves the workability. Such marking may only be performed in a part of the transparent insulation tube 9 and may be preferably performed in the same color as the lead wire.

The binding yarn 8 illustrated in FIG. 2 is strongly fixed to arrange the lead wires 5. For that reason, when the cold-pressure-welded joint portion is provided below the binding yarn 8, there is a concern that the cold-pressure-welded joint portion may be broken due to stress applied thereto. When the cold-pressure-welded joint portion is disposed at a position other than a position below the binding yarn 8, stress is not applied from the binding yarn 8 to the cold-pressure-welded joint portion, which hence prevents the cold-pressure-welded joint portion from being broken.

The binding yarn 8 is different from binding yarns (coil end binding yarns) that fix the coil ends 3a and 3b. The coil end binding yarn is used to fix all the coil ends 3a and 3b. But different from the lead wire binding yarn (the binding yarn 8), the coil end binding yarn need not be fixed strongly. No problem occurs even when the cold-pressure-welded joint portion is disposed below the coil end binding yarn.

Because the binding yarn 8, which is a drawn wire binding yarn, is strongly fixed, it is preferable that the fixing position of the binding yarn 8 be at a portion of the lead wire 5.

Because the mechanical strength of the aluminum wire 7 is lower than that of the copper wire 6, there is a concern that the aluminum wire 7 may be broken when the aluminum wire is disposed at the fixing position of the binding yarn 8 by mistake. For that reason, when a portion of the aluminum wire 7 is put within the coil ends 3a and 3b or the slots of the stator 1 after the aluminum wire 7 and the copper wire 6 are joined to each other by cold pressure welding, it is possible to prevent the aluminum wire 7 from being disposed at the fixing position of the binding yarn 8, which can prevent breakages and can improve in workability. With such a configuration, for example, with a molding operation for arranging a shape by applying an external pressure to the coil ends 3a and 3b as in the case of distributed winding, the pressure is not applied to the aluminum wire 7 and the deformation and the breakage of the aluminum wire 7 can be prevented. As a result, reliability can be improved.

Here, the vicinity of the cold-pressure-welded joint portion (a portion from the joint portion to the chuck portion) is weak under stress. For this reason, when a configuration is employed in which the vicinity of the cold-pressure-welded joint portion is accommodated inside the coil ends 3a and 3b and the vicinity of the cold-pressure-welded joint portion is not disposed on the coil ends 3a and 3b such that the molding pressure of the coil ends 3a and 3b is not directly applied to the vicinity of the cold-pressure-welded joint portion, it is possible to prevent the molding pressure of the coil ends 3a and 3b from being directly applied to the vicinity of the cold-pressure-welded joint portion and thus to prevent deformation and breakage in the vicinity of the cold-pressure-welded joint portion.

Cold pressure welding requires more time than mechanical swaging or soldering. For that reason, when two or more in-phase coils are connected in series to each other, the processing time can be shortened. For example, in a stator having two U-phase coils, two joint portions are provided in serial connection and four joint portions are provided in parallel connection. That is, the serial connection has an advantage in that the number of the joint portions is less than that of the parallel connection and thus the number of cold-pressure-welded joint portions decreases. As a result, the processing time can be shortened.

It is preferable that the in-phase coil of the serial connection be a single continuous coil and does not have a joint portion formed by soldering or mechanical swaging. Further, the same applies to a single-phase motor (a single-phase induction motor). For example, when a secondary coil is connected in series, the number of joint portions is small and hence producing time can be shortened. A coil having two or more secondary coils is also called an in-phase coil.

Because the aluminum wire is softer than the copper wire, a coil end may be deformed due to a large current flowing through the aluminum wire when an induction motor without an inverter is activated. However, because a current flowing through the secondary coil of the single-phase induction motor for the activation is small and the force applied to the coil end is small, a coil end is not easily deformed even when aluminum wire is used in the secondary coil. Further, in the motor of which the coil is formed by aluminum wire and copper wire, when the aluminum wire is disposed at the inside, the inner aluminum wire can be protected while being supported by the outer copper wire and thus the deformation of the aluminum wire due to stress can be prevented.

Further, because the cold-pressure-welded joint portion and the chuck portion have low mechanical strength, it is preferable to reduce vibrations in these portions. For example, when the coil end is coated with varnish and the coil is fixed, a vibration can be reduced. As a result, it is possible to obtain a motor having long operation time and high reliability.

In the related art, the motor using the aluminum wire can be decreased in weight, but has low mechanical strength at the joint portion. However, such a problem can be solved by the present embodiment, so that a blower or a compressor can be decreased in weight while reliability is kept.

When the above-described configuration is applied to a mold motor that is commonly used in a blower, a vibration generated in the cold-pressure-welded joint portion can be reduced and the cold-pressure-welded joint portion also is insulated. Accordingly, it can be said that the motor according to the present embodiment is particularly preferably used in the blower.

Further, because a high-temperature and high-pressure air, which are present within a compressor used in an air conditioner or the like, includes oil, refrigerant, moisture, or metal, the compressor may be destroyed due to creep deformation. According to the present embodiment, it is possible to use highly reliable cold pressure welding to join the aluminum wire and the copper wire to each other and to reliably insulate the cold-pressure-welded joint portion. When the above-described configuration is applied to a motor driving the compressor used in the air conditioner or the like, the compressor can be decreased in weight and can improve in reliability.

In this way, when the motor having the configuration described in the present embodiment is applied to the blower or the compressor, a device which is light and has high reliability can be provided.

The motor described in the present embodiment above is a motor including: a rotor; and a stator having a plurality of coils wound around slots, wherein at least any one of the coils includes a single aluminum wire, a single copper wire joined to the aluminum wire, a stranded wire that is joined to the copper wire, a cold-pressure-welded joint portion that is joined between the aluminum wire and the copper wire by cold pressure welding, and a non-pressure welded joint portion provided between the copper wire and the stranded wire. A burr covered by an insulation member is provided in the cold-pressure-welded joint portion. A thickness of the insulation member is larger than a height of the burr.

The motor of the present embodiment above is a motor including: a rotor; and a stator having a plurality of coils wound around the slots, wherein at least any one of the coils includes a single aluminum wire, a single copper wire that is joined to the aluminum wire via a joint portion, and a stranded wire that is joined to the copper wire. Each of the aluminum wire and the copper wire includes a low-strength portion that abuts on the joint portion and has mechanical strength lower than those of the other portions of the copper wire or the aluminum wire. A burr covered by an insulation member is provided in the joint portion. A thickness of the insulation member is larger than a height of the burr. It is preferable for the low-strength portion to be covered by the insulation member.

As described in the present embodiment above, when the aluminum wire and the copper wire are joined to each other, soldering or brazing is difficult to apply because the aluminum wire is easily oxidized and reliability cannot be kept. But, when cold pressure welding in which new metal faces (non-oxidized metal faces) are bonded to each other when the wires are pressed against each other is used, the aluminum wire and the copper wire can be joined to each other highly reliably and thus a highly reliable motor can be obtained. However, a burr is formed at the joint portion during cold pressure welding and the burr is not completely and easily removed. For this reason, when the joint portion is covered by the insulation member or the like, there is a concern that the insulation member may be broken by the burr that remains at the joint portion. Therefore, when the thickness of the insulation member is larger than the height of the burr of the cold-pressure-welded joint portion, the motor can be operated while the insulation member is not broken by the burr and the insulation between the coils is ensured.

INDUSTRIAL APPLICABILITY

As described above, the motor according to the present invention is useful for a device which needs to be decreased in weight and is particularly suitable for a blower and a compressor.

The invention claimed is:

1. A motor comprising:
a rotor; and
a stator having a plurality of coils wound around slots in the stator, wherein at least any one of the coils includes:
a single aluminum wire;
a single copper wire joined to the aluminum wire;
a stranded wire joined to the copper wire;
a cold-pressure-welded joint portion joining between the aluminum wire and the copper wire by cold pressure welding; and
a non-pressure welded joint portion provided between the copper wire and the stranded wire, and
a burr covered by an insulation member is provided in the cold-pressure-welded joint portion, wherein a thickness of the insulation member is larger than a height of the burr.

2. The motor according to claim 1, wherein
the copper wire includes a chuck portion that abuts on the cold-pressure-welded joint portion and that has low mechanical strength, and
a length from an end face of a stator core included in the stator to the chuck portion inside the copper wire is shorter than a length of the insulation member, the insulation member being cylindrical.

3. The motor according to claim 1, wherein the insulation member is transparent.

4. The motor according to claim 3, wherein the coil includes a plurality of the cold-pressure-welded joint portions and at least any one position of the insulation member covering the cold-pressure-welded joint portions is marked.

5. The motor according to claim 1, wherein a binding yarn fixing a drawn wire drawn out from the coil fixes the drawn wire such that the cold-pressure-welded joint portion does not receive stress.

6. The motor according to claim 5, wherein
the aluminum wire and the copper wire are disposed within a coil end of the stator, and
the stranded wire is fixed by the binding yarn.

7. The motor according to claim 1, wherein in-phase coils are connected in series in the aluminum wire.

8. A single-phase induction motor in which the motor according to claim 1 includes a primary coil and a secondary coil, wherein the secondary coil includes the aluminum wire.

9. The motor according to claim 1, wherein the coil and the cold-pressure-welded joint portion are coated with varnish.

10. The motor according to claim 1, wherein the insulation member is formed of a resin material.

11. The motor according to claim 1, wherein the cold-pressure-welded joint portion and the stator are covered by mold resin.

12. A blower comprising the motor according to claim 1.

13. A compressor comprising the motor according to claim 1.

14. A motor comprising:
a rotor; and
a stator having a plurality of coils wound around slots in the stator, wherein
at least any one of the coils includes:
a single aluminum wire;
a single copper wire joined to the aluminum wire via a joint portion; and
a stranded wire joined to the copper wire, wherein
each of the aluminum wire and the copper wire includes a low-strength portion that abuts on the joint portion and that has mechanical strength lower than that of the other portions of the copper wire or the aluminum wire,
a burr covered by an insulation member is provided in the joint portion, and
a thickness of the insulation member is larger than a height of the burr.

15. The motor according to claim 14, wherein the low-strength portion is covered by the insulation member.

16. A blower comprising the motor according to claim 14.

17. A compressor comprising the motor according to claim 14.

* * * * *